United States Patent
Otsuka et al.

(10) Patent No.: US 8,474,829 B2
(45) Date of Patent: Jul. 2, 2013

(54) SEALING DEVICE

(75) Inventors: Masaya Otsuka, Aso (JP); Shigemi Matsuo, Aso (JP); Daihachi Shojima, Aso (JP)

(73) Assignee: NOK Corporation (JP)

( * ) Notice: Subject to any disclaimer, the term of this patent is extended or adjusted under 35 U.S.C. 154(b) by 30 days.

(21) Appl. No.: 13/146,152

(22) PCT Filed: Dec. 15, 2009

(86) PCT No.: PCT/JP2009/070864
§ 371 (c)(1),
(2), (4) Date: Jul. 25, 2011

(87) PCT Pub. No.: WO2010/098001
PCT Pub. Date: Sep. 2, 2010

(65) Prior Publication Data
US 2011/0291364 A1 Dec. 1, 2011

(30) Foreign Application Priority Data
Feb. 24, 2009 (JP) ................... 2009-040698

(51) Int. Cl.
F16J 15/00 (2006.01)
F16J 15/02 (2006.01)
F16L 17/06 (2006.01)

(52) U.S. Cl.
USPC ............. 277/584; 277/611; 277/638

(58) Field of Classification Search
USPC .............................. 277/584, 611, 638
See application file for complete search history.

(56) References Cited

U.S. PATENT DOCUMENTS

| | | | |
|---|---|---|---|
| 2,797,971 A * | 7/1957 | Greenough | 277/448 |
| 3,071,386 A * | 1/1963 | Scannell | 277/582 |
| 3,172,670 A * | 3/1965 | Pras | 277/556 |
| 3,362,720 A * | 1/1968 | Henry et al. | 277/638 |
| 3,582,093 A * | 6/1971 | Lucien | 277/434 |
| 3,854,735 A * | 12/1974 | Maurer et al. | 277/638 |
| 3,905,608 A * | 9/1975 | Olsen et al. | 277/584 |
| 7,793,944 B2 * | 9/2010 | Otuka | 277/611 |
| 7,900,935 B2 * | 3/2011 | Kanagae | 277/584 |
| 7,997,583 B2 * | 8/2011 | Nakahara | 277/390 |
| 8,257,070 B2 * | 9/2012 | Maruo et al. | 418/132 |
| 8,282,107 B2 * | 10/2012 | Horiba et al. | 277/551 |

FOREIGN PATENT DOCUMENTS

| | | |
|---|---|---|
| DE | 19814145 A1 | 10/1998 |
| JP | S56-097654 | 8/1981 |
| JP | 03-113179 | 5/1991 |
| JP | 10-274335 A | 10/1998 |
| JP | 2002-276814 A | 9/2002 |
| JP | 2009-008238 A | 1/2009 |

* cited by examiner

*Primary Examiner* — Vishal Patel
*Assistant Examiner* — Stacy Warren
(74) *Attorney, Agent, or Firm* — Harness, Dickey & Pierce, P.L.C.

(57) ABSTRACT

To prevent breakage of a sealing device having a main sealing body installed within an annular installing groove (31) formed in one member (3) to slidably and concentrically contact with the other member (2) and a backup ring (12) arranged at a non-sealing space side of said main sealing body, a height ($h_1 \pm \Delta h_1$) of said backup ring (12) in a facing direction of a bottom surface (31a) of said installing groove (31) to the other member (2) is greater than a facing distance ($L \pm \Delta L$) between the bottom surface (31a) and the other member (2), and said backup ring (12) has a cross-sectional shape which is symmetrical in a thickness direction thereof, and has an easily compressible part (12a) which can be compressed to the extent of the difference (x) between said height ($h_1 \pm \Delta h_1$) and said facing distance ($L \pm \Delta L$).

4 Claims, 4 Drawing Sheets

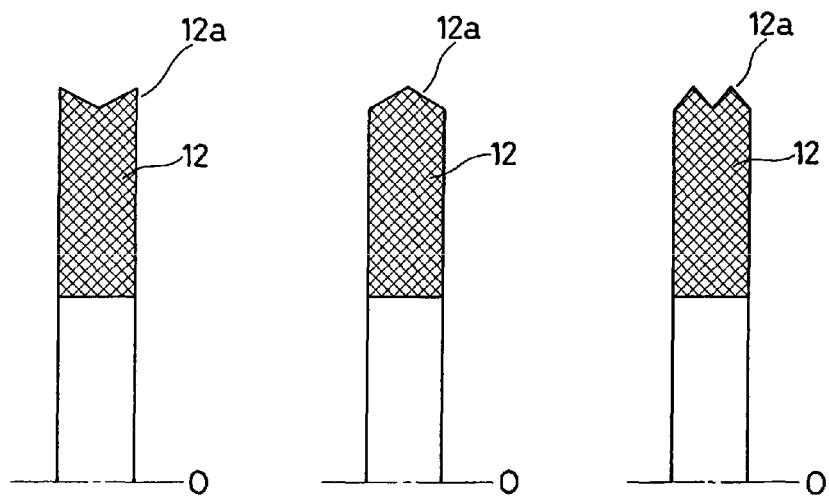
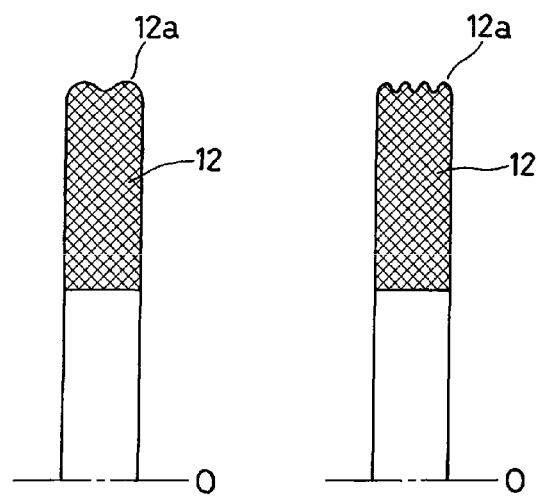

SEALING DEVICE

CROSS-REFERENCE TO RELATED APPLICATIONS

This is a national stage of the International Application No. PCT/JP2009/070864 filed on Dec. 15, 2009 and published in the Japanese language as WO 2010/098001 A1 on Sep. 2, 2010. This application claims priority to Japanese Application No. JP 2009-040698 filed on Feb. 24, 2009. The disclosures of the above applications are incorporated herein by reference.

BACKGROUND OF THE INVENTION

1. Field of the Invention

The present invention relates to a sealing device sealing between two members which are concentrically arranged and move relatively, and more particularly to a structure in which a main sealing body is installed together with a backup ring within an installing groove of one member, and the main sealing body is supported by the backup ring.

2. Description of the Conventional Art

Conventionally, as a sealing device which is used in equipment generating high fluid pressure to be sealed, for example, a hydraulic cylinder, a hydraulic shock absorber, a plunger type pump or the like, a structure as shown in FIG. 5 has been known.

In particular, a sealing device 100 shown in FIG. 5 is structured such as to seal working fluid within a sealing space S1 between an outer peripheral member 110 (for example, a cylinder of a hydraulic device) and an outer peripheral surface of an inner peripheral member 120 (for example, a piston of a hydraulic device) arranged in an inner periphery thereof so as to freely reciprocate in an axial direction, is constructed by a main sealing body 101 which is formed by a rubber-like elastic material (a rubber material or a synthetic resin material having a rubber-like elasticity), and a backup ring 102 which is arranged at the non-sealing space S2 side of the main sealing body 101 (at the side of a space opposite to the sealing space S1 as seen from the main sealing body 101), and is installed in a state of being contained within an installing groove 121 which is formed in an outer peripheral surface of the inner peripheral member 120. The main sealing body 101 is a so-called O-ring having a circular cross section, and is installed in an appropriately compressed state, between a bottom surface 121a of the installing groove 121 and an inner peripheral surface of the outer peripheral member 110.

In this case, the backup ring 102 is formed by a synthetic resin material which is harder than the main sealing body 101, and is structured such as to support the main sealing body 101 from the non-sealing space S2 side within the installing groove 121, for preventing the main sealing body 101 to which high pressure is applied at a time when the sealing space S1 comes to have the high pressure, from running over to a gap G1 between a groove shoulder at the non-sealing space S2 side in the installing groove 121 and the inner peripheral surface of the outer peripheral member 110 so as to be broken.

However, in accordance with the sealing device 100 provided with the structure mentioned above, a gap G2 between the backup ring 102 and the outer peripheral member 110 becomes larger in some instances due to a dimensional tolerance of the installing groove 121 or the backup ring 102, and even though the backup ring 102 is provided actually for closing the gap G1 between the outer peripheral member 110 and the inner peripheral member 120, there is a risk that the main sealing body 101 runs over to the gap G2 between the backup ring 102 and the outer peripheral member 110 so as to be broken, as shown in FIG. 6.

Accordingly, as a technique for preventing the gap G2 between the backup ring 102 and the outer peripheral member 110 as mentioned above from being made, for example, there has been known a technique disclosed in Japanese Unexamined Patent Publication No. 3-113179 and Japanese Unexamined Patent Publication No. 2009-8238.

SUMMARY OF THE INVENTION

Problem to be Solved by the Invention

However, in these conventional arts, since it is necessary to work the installing groove into a particular cross sectional shape in the art disclosed in Japanese Unexamined Patent Publication No. 3-113179, such a problem that a working cost becomes high is pointed out, and since the backup ring is formed as a two-sided shape in the art disclosed in Japanese Unexamined Patent Publication No. 2009-8238, such a risk that an erroneous assembly is caused at a time of assembling in the installing groove is pointed out.

The present invention is made by taking the points mentioned above into consideration, and a technical problem of the present invention is to securely prevent breakage due to running over of a main sealing body at a time of high pressure, without causing a rise in cost and an erroneous assembly, in a sealing device structured such that the main sealing body is supported by a backup ring within an installing groove.

Means for Solving the Problem

As a means for effectively solving the technical problem mentioned above, in accordance with a first aspect of the present invention, there is provided a sealing device comprising:

a main sealing body which is installed within an annular installing groove formed in one member of two members concentrically arranged with each other and is slidably brought into close contact with the other member; and a backup ring which is arranged at a non-sealing space side of the main sealing body within the installing groove, wherein a height of the backup ring in a facing direction of a bottom surface of the installing groove to the other member is greater than a facing distance between the bottom surface of the installing groove and the other member, and the backup ring has a cross sectional shape which is symmetrical in a thickness direction thereof, and is formed to have an easily compressible part which can be compressed to the extent of the difference between the height and the facing distance.

Further, in accordance with a second aspect of the present invention, there is provided the sealing device as recited in the first aspect, wherein a second backup ring made of a harder material than the backup ring is arranged within the installing groove so as to be positioned at the non-sealing space side of the backup ring, and a height of the second backup ring in the facing direction of the bottom surface of the installing groove to the other member is greater than a depth of the installing groove, and is equal to or less than the facing distance between the bottom surface of the installing groove and the other member.

Effect of the Invention

On the basis of the sealing device in accordance with the first aspect of the present invention, since the backup ring absorbs the tolerance of the facing distance between the bottom surface of the installing groove formed in the one member and the other member, and the tolerance of the height of the backup ring, on the basis of a compressive deformation of the easily compressible part, and the gap to which the main sealing body runs over is not made between the backup ring and the other member, it is possible to securely prevent breakage caused by the running over of the main sealing body so as to improve a pressure resistance. Further, since the backup ring has the cross sectional shape which is symmetrical in the thickness direction thereof, an erroneous assembly is not caused. Since there is no increase of the number of parts and a working cost, it is possible to provide the device at a low cost.

On the basis of the sealing device in accordance with the second aspect of the present invention, since it is possible to prevent the backup ring itself from running over, it is possible to further improve the pressure resistance.

BRIEF EXPLANATION OF THE DRAWINGS

FIG. 4 is a half sectional view showing a shape example of a backup ring in the other embodiment of the sealing device in accordance with the present invention, by cutting along a plane passing through an axis O;

DETAILED DESCRIPTION OF PREFERRED EMBODIMENTS

Figure 1:
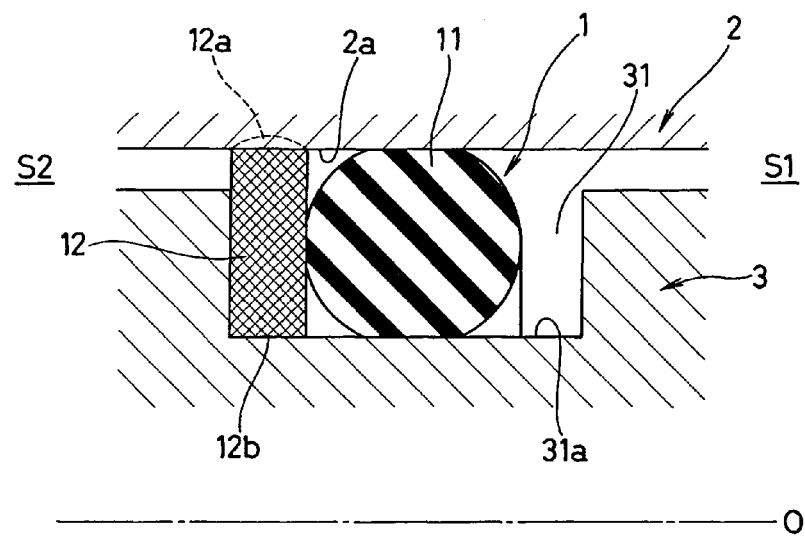
FIG. 1 is a half sectional view in an installed state to show a first embodiment of a sealing device in accordance with the present invention by cutting along a plane passing through an axis O.

A description will be given below of preferable embodiments of a sealing device in accordance with the present invention with reference to the accompanying drawings. First of all, in a first embodiment shown in FIG. 1, reference numeral 2 denotes an outer peripheral member (for example, a cylinder of a hydraulic device), and reference numeral 3 denotes an inner peripheral member (for example, a piston of the hydraulic device) which is arranged concentrically in an inner periphery of the outer peripheral member 2 so as to freely reciprocate in an axial direction. In this case, the inner peripheral member 3 corresponds to one member described in the first aspect, and the outer peripheral member 2 corresponds to the other member described in the first aspect of the present invention.

The sealing device 1 is structured such as to seal working fluid within a sealing space S1 between an outer peripheral member 2 and an inner peripheral member 3, is constructed by an O-ring 11 which is formed by a rubber-like elastic material (a rubber material or a synthetic resin material having a rubber-like elasticity) and a backup ring 12 which is arranged at the non-sealing space S2 side of the O-ring 11 (at the side of a space opposite to the sealing space S1 as seen from the O-ring 11), and is installed in a state of being contained within an installing groove 31 which is formed in an annular shape around an axis O thereof in an outer peripheral surface of the inner peripheral member 3.

The O-ring 11 is a packing in which a cross sectional shape (an illustrated cross sectional shape) cut along by a plane passing through the axis O is a circular shape, corresponds to a main sealing body described in the first aspect of the present invention, is interposed in an appropriately compressed state between a bottom surface 31a of the installing groove 31 and an inner peripheral surface 2a of the outer peripheral member 2, and is structured such as to separate the sealing space S1 and the non-sealing space S2 by slidable close contact with the inner peripheral surface 2a of the outer peripheral member 2.

Figure 2:
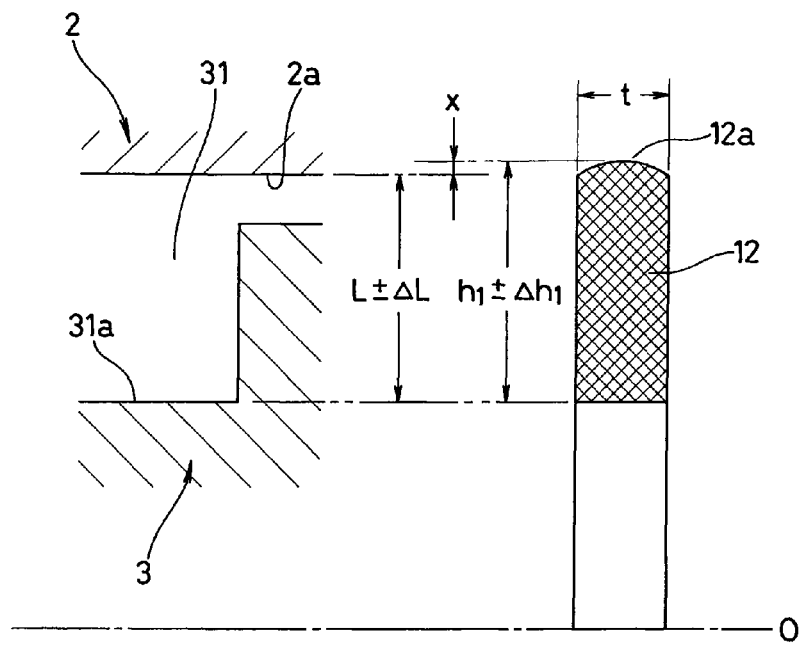
FIG. 2 is a sectional view showing a relationship between a backup ring and an installing groove constructing the sealing device in accordance with the first embodiment by cutting along a plane passing through the axis O.

The backup ring 12 is formed in a flat annular shape by a synthetic resin material in which a harder material than the O-ring 11, for example, a polytetrafluoroethylene (PTFE) is used as a base material, and is interposed between the O-ring 11 and an inner sideward surface at the non-sealing space S2 side in the installing groove 31. Further, as shown in FIG. 2, a height $h1 \pm \Delta h1$ ($\Delta h1$ is a dimensional tolerance) of the backup ring 12 in a facing direction of the bottom surface 31a of the installing groove 31 to the inner peripheral surface 2a of the outer peripheral member 2 (a radial direction) is set to have a magnitude which is equal to or more than a facing distance $L \pm \Delta L$ ($\Delta L$ is a dimensional tolerance) between the bottom surface 31a of the installing groove 31 and the inner peripheral surface 2a of the outer peripheral member 2.

Further, the backup ring 12 is formed in a cross sectional shape which is symmetrical in a thickness direction thereof, and a collapsing margin x thereof, that is, an outer diameter portion corresponding to $(h1 \pm \Delta h1) - (L \pm \Delta L)$ constitutes an easily compressible part 12a formed in a bulging shape in which a cross sectional shape cut along a plane passing through the axis O forms a circular arc. In other words, when an area of the cross section is set to S, and the thickness in the axial direction of the backup ring 12 is set to t, the easily compressible part 12a is easily compressed in comparison with the other portions on the basis of the fact of $S < t \cdot x$, and is compressed to the extent of the collapsing margin x in an installed state shown in FIG. 1.

In the sealing device 1 provided with the structure mentioned above, if working pressure is applied to working fluid within the sealing space S1 in the installed state shown in FIG. 1 (the sealing space S1 comes to have high pressure), the O-ring 11, which is going to be displaced by the pressure toward the non-sealing space S2 side having relatively low pressure within the installing groove 31, is supported by the backup ring 12.

Further, in the backup ring 12, the easily compressible part 12a corresponding to the outer diameter portion comes into close contact with the inner peripheral surface 2a of the outer peripheral member 2 in a compressed state, and the inner peripheral surface 12b comes into close contact with the bottom surface 31a of the installing groove 31 under appropriate surface pressure by compression reaction force of the easily compressible part 12a. In other words, it is possible to absorb the dimensional tolerance $\Delta L$ of the facing distance between the bottom surface 31a of the installing groove 31 and the inner peripheral surface 2a of the outer peripheral member 2 and the dimensional tolerance $\Delta h1$ of the height of the backup ring 12 by the compression deformation of the easily compressible part 12a, so that it is possible to prevent a gap to which the O-ring 11 runs over from being made on the inner and outer peripheries of the backup ring 12, or to hold down the gap to be made. Accordingly, it is possible to securely prevent breakage caused by the running over of the O-ring 11.

Further, since the backup ring 12 is made of the synthetic resin material in which the PTFE is used as the base material and has a low friction, increase of friction resistance caused by a sliding motion with respect to the inner peripheral surface 2a of the outer peripheral member 2 can be held down.

Further, since the backup ring 12 is formed in the bulging shape in which the cross sectional shape of the easily compressible part 12a is the circular arc shape, and is formed in a shape without being two-sided in the cross sectional shape which is symmetrical in the thickness direction as a whole, an erroneous assembly is not caused. Since it is not necessary to form the installing groove 31 in a particular shape, rise of a working cost is not caused.

Figure 3:
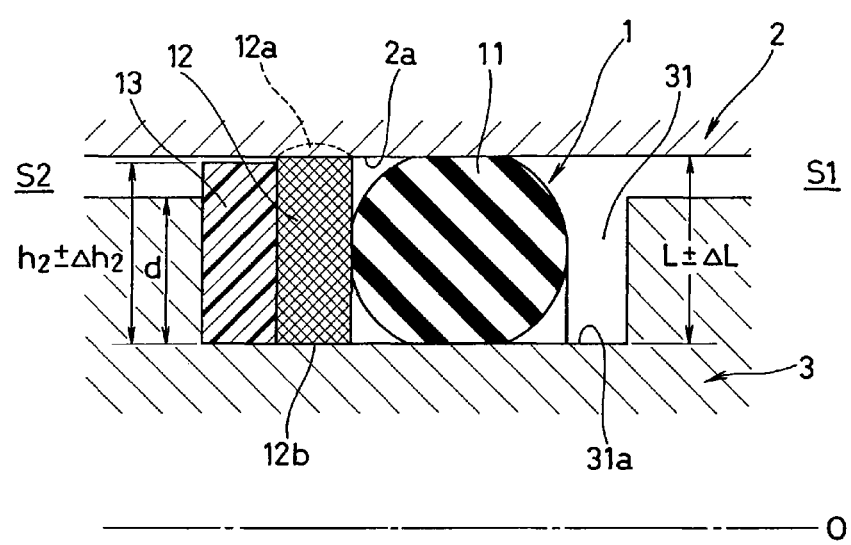
FIG. 3 is a half sectional view in an installed state to show a second embodiment of a sealing device in accordance with the present invention by cutting along a plane passing through an axis O.
Figure 5:
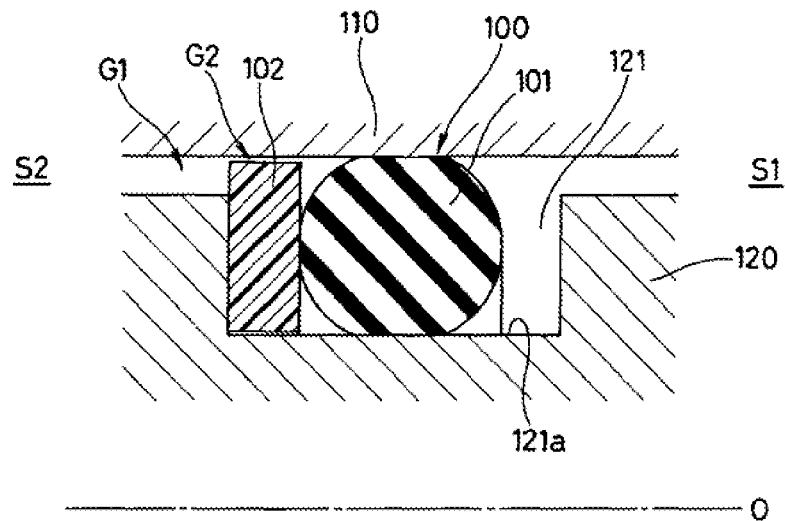
FIG. 5 is a half sectional view showing an example of a sealing device in accordance with the conventional art by cutting along a plane passing through an axis O.
Figure 6:
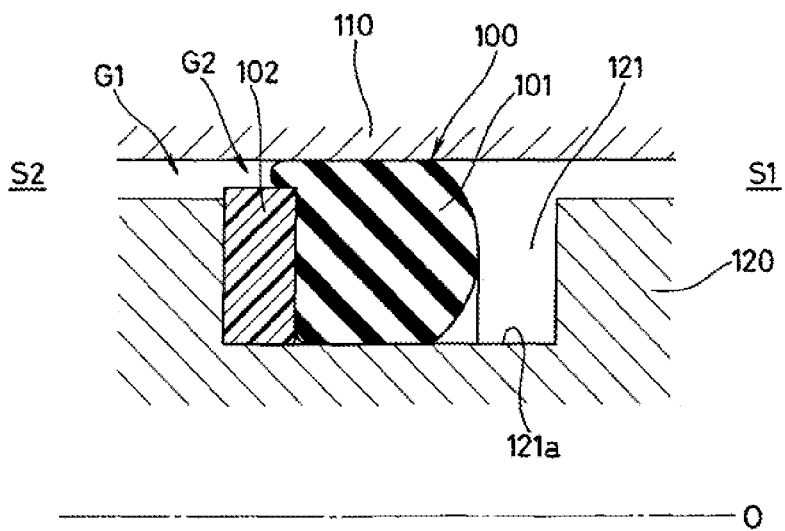
FIG. 6 is a half sectional view showing a state in which running over of a main sealing body is caused, by cutting along a plane passing through an axis O, in the prior art.

Next, a description will be given of a second embodiment shown in FIG. 3. In this embodiment, a difference from the first embodiment described previously exists in a point that a second backup ring 13 is provided further at the non-sealing space S2 side of the backup ring 12 within the installing groove 31. In other words, the second backup ring 13 is interposed between the backup ring 12, and an inner sideward surface at the non-sealing space S2 side in the installing groove 31.

In more detail, the backup ring 12 is made of the synthetic resin material in which, for example, the PTFE is used as the base material, and is structured such that the height h1±Δh1 of the backup ring 12 is set to have a magnitude which is equal to or more than the facing distance L±ΔL between the bottom surface 31a of the installing groove 31 and the inner peripheral surface 2a of the outer peripheral member 2, and the easily compressible part 12a satisfying the relationship of S<t·x as described previously is formed in the outer diameter portion, similarly to FIG. 2 which is described previously.

On the other hand, the second backup ring 13 is made of a synthetic resin material which is harder than the backup ring 12, for example, a nylon, a polyphenylene sulfide (PPS), a polyacetal (POM), a polyamide (PA), a polyether ether ketone (PEEK) or the like, a height h2±Δh2 (Δh2 is a dimensional tolerance) in a radial direction is greater than a groove depth d of the installing groove 31, and is equal to or less than the facing distance L±ΔL between the bottom surface 31a of the installing groove 31 and the inner peripheral surface 2a of the outer peripheral member 2.

In accordance with the second embodiment constructed as mentioned above, owing to the second backup ring 13, it is possible to prevent the backup ring 12 itself supporting the O-ring 11 from running over to the gap at the non-sealing space S2 side of the installing groove 31 by being pushed by the O-ring 11 so as to deform, at a time when the sealing space S1 comes to have significantly high pressure. In other words, the backup ring 12 is harder than the O-ring 11, however, is made of the comparatively soft synthetic resin material such as the PTFE or the like taking a low friction sliding performance into consideration. On the contrary, since the second backup ring 13 made of the harder material supports the backup ring 12, it is possible to achieve further excellent pressure resistance.

In this case, in each of the embodiments mentioned above, the easily compressible portion 12a can be formed in various shapes like as a shape example of the backup ring 12 shown in FIG. 4.

Among them, an example shown in FIG. 4A is structured such that the easily compressible part 12a is formed in a concave shape having a V-shaped cross section, an example shown in FIG. 4B is structured such that the easily compressible part 12a is formed in a convex shape having a chevron shaped cross section, an example shown in FIG. 4C is structured such that the easily compressible part 12a is formed in a shape having a plurality of convex surfaces in a chevron cross sectional shape, and examples shown in FIGS. 4D and 4E are structured such that the easily compressible part 12a is formed in a shape having a plurality of convex surfaces formed in a curved shape. All the examples satisfy the relationship of S<t·x which is described previously.

Particularly, since the easily compressible part 12a shown in FIG. 4A is formed in such a shape that an outer diameter becomes larger at both ends in the axial direction, it is possible to securely prevent the gap, to which the O-ring 11 runs over, from being made, even in the case that the collapsing margin x is comparatively small on the basis of the dimensional tolerance.

In this case, in each of the embodiments mentioned above, the easily compressible part 12a is formed in the outer diameter portion of the backup ring 12, and is brought into close contact with the inner peripheral surface 2a of the outer peripheral member 2. However, the easily compressible part 12a may be formed inversely in the inner diameter portion of the backup ring 12 so as to be brought into close contact with the bottom surface 31a of the installing groove 31 in a compressed state.

Further, FIG. 1 shows the case that the O-ring 11 is used as the main sealing body. However, the present invention can be applied in the same manner to a case that the main sealing body is an other packing, for example, an X-ring (a packing in which a cross sectional shape cut along the plane passing through the axis O is formed in an approximately X-shape) or the like.

Further, FIGS. 1 and 2 show the case that the installing groove 31 is formed in the inner peripheral member 3. However, the present invention can be applied in the same manner to a case that the installing groove is formed in the inner peripheral surface 2a of the outer peripheral member 2 and the main sealing body and the backup ring are installed to such the installing groove.

Further, the sealing device in accordance with the present invention can be applied as a sealing means for various equipments generating high pressure in fluid, without being limited to the hydraulic equipment.

What is claimed is:

1. A sealing device comprising:
    a main sealing body which is installed within an annular installing groove formed in a first member of two members concentrically arranged with each other and is slidably brought into close contact with a second member of the two members; and
    a backup ring made of a harder material than said main sealing body which is arranged at a non-sealing space side of said main sealing body within said installing groove,
    wherein a height of said backup ring in a perpendicular direction from a bottom surface of said installing groove to the second member is greater than a perpendicular distance between the bottom surface of said installing groove and the second member, and said backup ring has a cross sectional shape which is symmetrical about a radial axis located midway in an axial thickness of said backup ring, and has an easily compressible outer diameter curved portion corresponding to a collapsing margin of said backup ring and which can be compressed to the extent of the difference between said height and said perpendicular distance.

2. The sealing device as claimed in claim 1, wherein a second backup ring made of a harder material than said backup ring is arranged within the installing groove so as to be positioned at the non-sealing space side of the backup ring, and a height of said second backup ring in the perpendicular direction of the bottom surface of said installing groove to the second member is greater than a depth of said installing groove, and is equal to or less than the perpendicular distance between the bottom surface of said installing groove and the second member.

3. The sealing device as claimed in claim 1, wherein the curved portion is convex.

4. The sealing device as claimed in claim 1, wherein the curved portion is a convex surface or a plurality of convex surfaces.

* * * * *